(12) United States Patent
Gedeon-Janvier

(10) Patent No.: US 9,321,471 B1
(45) Date of Patent: Apr. 26, 2016

(54) ADJUSTABLE AND COLLAPSIBLE HAND TRUCK WITH LIFTING APPARATUS

(71) Applicant: Maxime Gedeon-Janvier, Inwood, NY (US)

(72) Inventor: Maxime Gedeon-Janvier, Inwood, NY (US)

(*) Notice: Subject to any disclaimer, the term of this patent is extended or adjusted under 35 U.S.C. 154(b) by 8 days.

(21) Appl. No.: 14/470,199

(22) Filed: Aug. 27, 2014

Related U.S. Application Data

(60) Provisional application No. 61/884,560, filed on Sep. 30, 2013.

(51) Int. Cl.
*B62B 1/04* (2006.01)
*B62B 1/00* (2006.01)
*B62B 1/12* (2006.01)

(52) U.S. Cl.
CPC .. *B62B 1/002* (2013.01); *B62B 1/12* (2013.01)

(58) Field of Classification Search
CPC ............ B62B 1/04; B62B 1/08; B62B 1/042; B62B 3/02
USPC .................. 280/47.18, 47.27, 47.28, 47.2
See application file for complete search history.

(56) References Cited

U.S. PATENT DOCUMENTS

| | | | | |
|---|---|---|---|---|
| 3,729,209 A * | 4/1973 | Litz | ............... | 280/652 |
| 3,850,441 A * | 11/1974 | Peters et al. | .................. | 280/47.2 |
| 3,873,118 A * | 3/1975 | Takagi | ........................ | 280/47.2 |
| 4,284,286 A * | 8/1981 | Lewallen | ........................ | 280/30 |
| 4,728,245 A * | 3/1988 | Shelton | ........................ | 414/490 |
| 4,921,270 A * | 5/1990 | Schoberg | .................... | 280/655.1 |
| 4,978,132 A | 12/1990 | Wilson et al. | | |
| 5,207,439 A * | 5/1993 | Mortenson | .................... | 280/47.2 |
| 5,246,239 A | 9/1993 | Braden | | |
| 5,277,439 A * | 1/1994 | Pipes et al. | ..................... | 280/47.2 |
| 5,322,143 A * | 6/1994 | Curran | .......................... | 187/211 |
| 5,474,312 A * | 12/1995 | Starita et al. | ................ | 280/47.19 |
| 5,536,034 A | 7/1996 | Miller | | |
| 5,810,373 A * | 9/1998 | Miranda | ....................... | 280/47.2 |
| 5,836,595 A * | 11/1998 | Brice | ............................... | 280/30 |
| 6,273,438 B1 * | 8/2001 | Prapavat | .................... | 280/47.21 |
| 6,328,319 B1 * | 12/2001 | Stahler, Sr. | ................. | 280/47.18 |
| 6,341,788 B1 * | 1/2002 | Ciccone | ..................... | 280/47.28 |
| 6,364,328 B1 * | 4/2002 | Stahler, Sr. | ................. | 280/47.18 |
| 6,530,583 B1 | 3/2003 | Mueller | | |
| 6,758,482 B2 | 7/2004 | Stallbaumer | | |
| 6,880,835 B2 * | 4/2005 | Tornabene et al. | ............. | 280/30 |
| 7,255,355 B2 * | 8/2007 | Chisholm et al. | ............... | 280/30 |
| 7,380,778 B2 | 6/2008 | Lawrence et al. | | |
| 7,588,255 B2 * | 9/2009 | Katz | .......................... | 280/47.27 |
| 8,100,430 B2 | 1/2012 | Meyers et al. | | |
| 8,360,444 B2 * | 1/2013 | Colacecchi | ................... | 280/47.2 |
| 8,448,956 B2 * | 5/2013 | Wise | ............................... | 280/30 |
| 8,465,046 B2 | 6/2013 | Meyers et al. | | |
| 8,550,476 B1 * | 10/2013 | Whinnery | ................... | 280/47.27 |
| 2004/0188964 A1 * | 9/2004 | Choi et al. | ................. | 280/47.27 |
| 2008/0203687 A1 * | 8/2008 | Meyers et al. | ............. | 280/47.18 |
| 2010/0270763 A1 * | 10/2010 | Nassaux et al. | .............. | 280/47.2 |

* cited by examiner

*Primary Examiner* — Jeffrey J Restifo
(74) *Attorney, Agent, or Firm* — Wendy W. Koba

(57) ABSTRACT

A hand truck is designed to include three separate frame components: (1) a main component, which is defined as a conventional hand truck frame; (2) a pivoting frame component connected along one end termination of the main frame via a hinge (allowing for the pivoting frame to be raised with respect to the main frame component and create a platform at a raised elevation); and (3) a back frame component that is connected to a rear portion of the main frame and may be extended to allow for the frame to have a four-point (i.e., "four-wheeled") configuration. A removable jack may be positioned between the back frame and the pivoting frame and used to raise/lower the pivoting frame.

11 Claims, 10 Drawing Sheets

ADJUSTABLE AND COLLAPSIBLE HAND TRUCK WITH LIFTING APPARATUS

CROSS-REFERENCE TO RELATED APPLICATIONS

This application claims the benefit of U.S. Provisional Application No. 61/884,560, filed Sep. 30, 2013 and incorporated by reference herein.

TECHNICAL FIELD

The present invention relates to a hand truck and, more particularly, to a hand truck that includes a pivoting frame component that can be used to support the transfer of a horizontal load between the hand truck and a defined location (such as a loading platform, truck bed, or the like).

BACKGROUND OF THE INVENTION

The basic two-wheeled upright hand truck has been an indispensable tool in businesses and homes for many years. Various modifications to the two-wheeled hand truck have been developed to make the hand truck more functional, such as means for securing articles to the frame of the hand truck, supplying the hand truck with powered lifting capabilities, braking and anti-tip mechanisms, or particular combinations of handle placements and positions.

One particular development has been the two-wheeled upright hand truck that is convertible to a four-wheeled push cart. One representative example of such a hand truck is found in U.S. Pat. No. 3,785,669 to Doheny, wherein a pivotable handle mounted near the top of the upright hand truck and having smaller wheels attached to the ends thereof may be pivoted relative to the frame in order to bring the handle into an upright position and the wheels into contact with the floor when the hand truck is lowered to a horizontal position. One exemplary arrangement of such a two-wheel to four-wheel conversion is shown in U.S. Pat. No. 4,921,270 issued to C. J. Schoberg. Another is shown in U.S. Pat. No. 8,100,430 issued to P. F. Meyers et al.

While these and other prior art "convertible" hand trucks are useful, there are situations where it is needed to transport a load from a first elevation to a second elevation (e.g., from the back of a truck to ground level, or from ground level to a loading platform). This is a particularly difficult, yet common occurrence (such as when moving heavy appliances from one location to another).

The hand truck arrangements of the prior art do not display this functionality of moving a load from one elevation to another.

SUMMARY OF THE INVENTION

The needs remaining in the prior art are addressed by the present invention, which relates to a hand truck and, more particularly, to a hand truck that includes a pivoting frame component that can be converted into a platform component and used to support the transfer of a horizontal load between the hand truck and a defined location (such as a loading platform, truck bed, or the like).

In accordance with the present invention, the novel hand truck comprises three separate frame components, a main component, which is defined as a conventional hand truck frame, a pivoting frame component connected along one end termination of the main frame via a hinge, allowing for the pivoting frame to be raised with respect to the main frame component and create a platform at a raised elevation. A third, "back" frame component is connected to a rear portion of the main frame and may be extended to allow for the frame to have a four-point (i.e., "four-wheeled") configuration.

In one embodiment, a removable jack is positioned between the back frame component and the pivoting frame component to assist in moving the pivoting frame relative to the main frame (particularly useful when working with heavy loads).

A particular embodiment of the present invention comprises a hand truck for transporting loads and includes: (1) a main frame, including a pair of primary wheels attached to a lower end termination and a handle attached to an upper end termination; (2) a back frame, rotatably attached to a rear portion of the main frame along a first hinge member, the back frame including a pair of secondary wheels attached to a lower end termination, the back frame for moving between a closed position when in contact with the main frame and an open position as controlled by the first hinge member; and (3) a pivoting frame, rotatably attached to a front portion of the main frame along a second hinge member, the pivoting frame for moving between a closed position when in contact with the main frame and an open position as controlled by the second hinge member.

Other and further embodiments and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
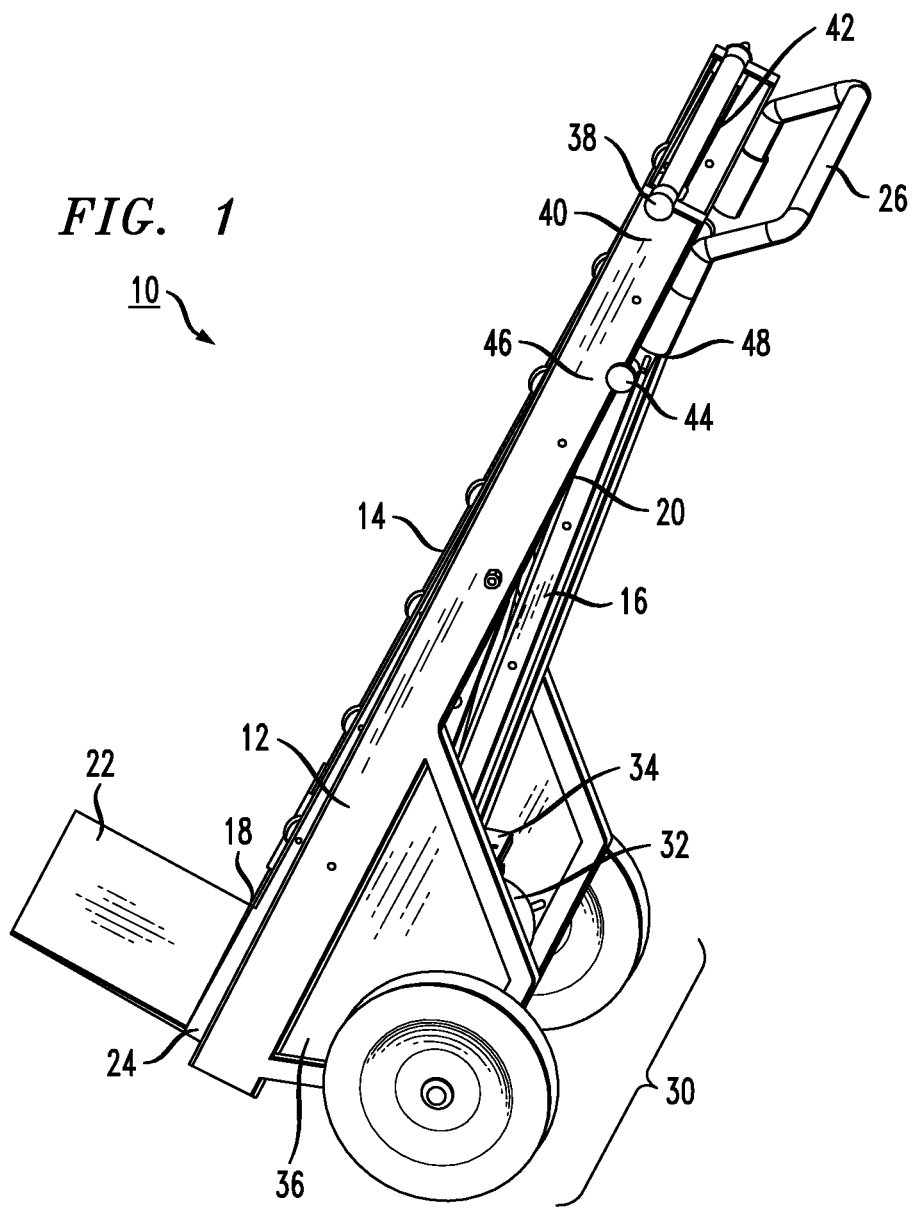
FIG. 1 is an isometric view of the hand truck of the present invention, shown in its "closed" position.

FIG. 1 is an isometric side view of an exemplary hand truck 10 formed in accordance with the present invention, including a main frame 12, a pivoting frame 14 and a back frame 16. In this particular view, hand truck 10 is shown in its "collapsed" configuration with pivoting frame 14 in its closed position against a front face 18 of main frame 12, and back frame 16 closed to be positioned against a back face 20 of main frame 12. Also shown in this view is a toe plate 22 (which is attached along a bottom termination 24 of pivoting frame 14) and a handle 26 (which is attached along a top termination 28 of main frame 12). Main frame 12 is shown as also including a pair of primary wheels 30, used to impart motion to hand truck 10. Somewhat concealed in this particular view is a pair of secondary wheels 32 that is attached to a lower termination 34 of back frame 16. When in the collapsed configuration as shown in FIG. 1, secondary wheels 32 will be positioned within an enclosed portion 36 of main frame 12.

As will be discussed in detail below, an important feature of hand truck 10 of the present invention is its ability to be re-configured to support a raised load in a horizontal position. That capability is provided by moving pivoting frame 14 from its closed to its open position, where the movement of pivoting frame 14 is provided by a hinge member 38 attached between an upper end termination 40 of main frame 12 and an upper end termination 42 of pivoting frame 14. When pivoting frame 14 is rotated into a horizontal position, it then forms a raised platform ("raised" with respect to ground level) and is able to transfer or move a relatively heavy load (e.g., transfer loads between a loading platform and the hand truck).

Figure 2:
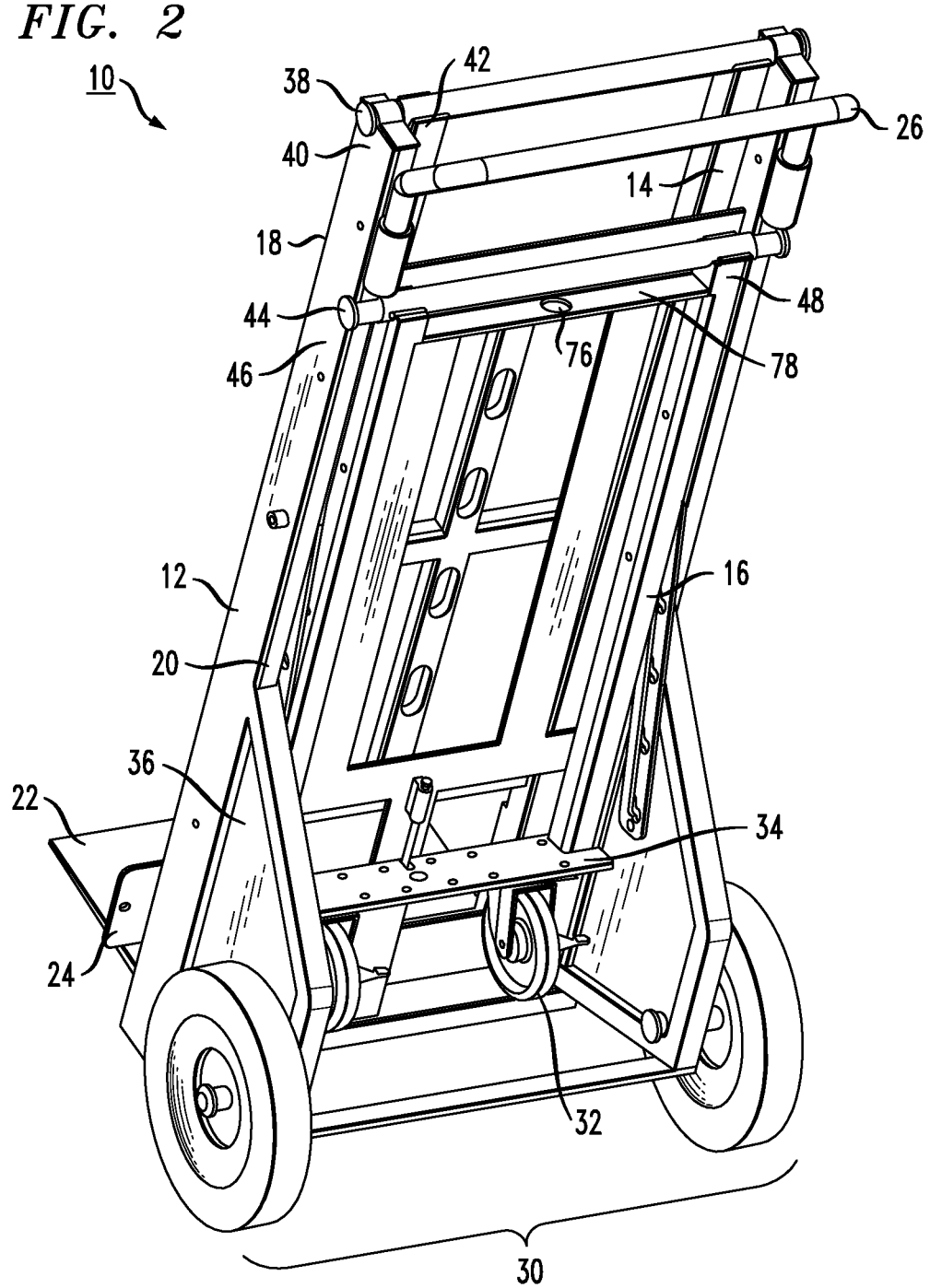
FIG. 2 is another view of the "closed" hand trunk as shown in FIG. 1.

A second hinge member 44 is used to open back frame 16 from main frame 12, allowing for secondary wheels 32 to then be placed on the floor and convert hand truck 10 from a two-wheeled truck to a four-wheeled truck. As shown, hinge member 44 is coupled between a side termination 46 of main frame 12 and an upper termination 48 of back frame 16. FIG. 2 is an alternative isometric view of the "closed" position of hand truck 10, where the positioning of secondary wheels 32 within enclosed portion 36 is evident in this view.

Figure 3:
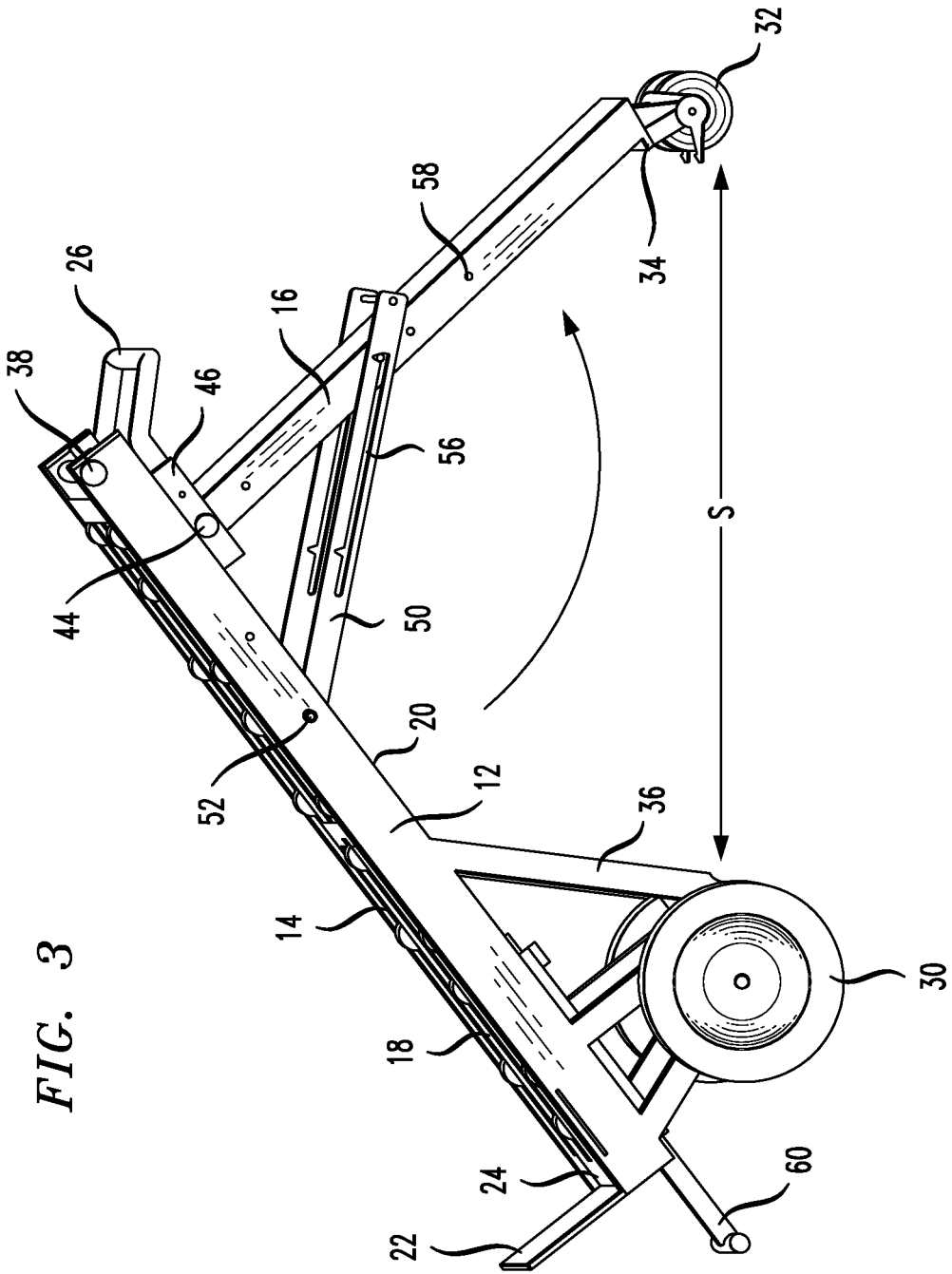
FIG. 3 is a side view of the inventive hand truck, in this case with the rear frame extended to form a "four-wheeled" configuration.

FIG. 3 is a side view of hand truck 10 in its four-wheeled position, with both primary wheels 30 and secondary wheels in contact with the ground. This configuration is obtained by moving back frame 16 outward and away from main frame 12 (via hinge member 44), as shown by the arrow in FIG. 3. In this particular embodiment, a pair of support brackets 50 is used to adjustably set the separation S between primary wheels 30 and secondary wheels 32 at a desired spacing. As shown, support brackets 50 are attached at first end terminations 52 to main frame 12 in a manner such that the brackets are permanently attached to main frame 12, but remain free to rotate. In this embodiment, brackets 50 include slots 56, which then engage back frame 16 at a selected "stop" location, defined by a plurality of pins 58 disposed along back frame 16. This use of slotted brackets and pins thus allows for the separation S to be adjustable, depending on the particular use for the four-wheeled truck. As will be described in detail below, main frame 10 may also include a kick stop 60, attached to end termination 24 and used to further stabilize the four-wheeled configuration of hand truck 10. Preferably, kick stop 60 may be raised or lowered, as needed.

Figure 4:
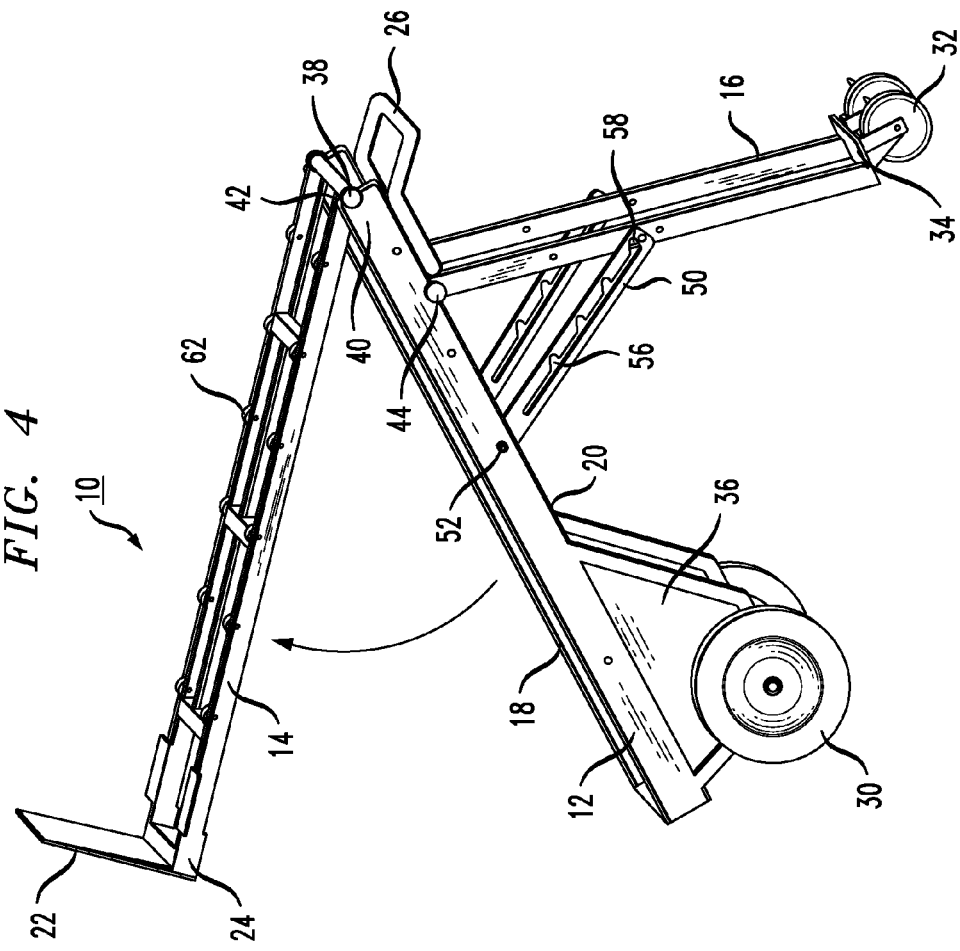
FIG. 4 is a side view of the inventive hand truck, showing the motion required to rotating the pivoting frame with respect to the main frame, forming a horizontal platform in a raised position with respect to the main frame.

FIG. 4 illustrates hand truck 10 in its fully "open" form, with pivoting frame 14 pivoted away from main frame 12, as indicated by the arrow in FIG. 4. In particular, and as described above, pivoting frame 14 is rotated with respect to main frame 12 via hinge member 38, which allows for the two frame pieces to stay connected, yet pivot with respect to each other. In this particular embodiment, pivoting frame 14 is shown as including a plurality of rollers 62 disposed along the length thereof. In this configuration, inventive hand truck 10 provides a raised platform (i.e., the horizontally-positioned pivoting frame 14) that may be used to easily and efficiently transfer a load between hand truck 10 and, for example, the back of a truck, loading platform, or the like. Rollers 62 are considered to assist in moving a relatively load either onto or off of pivoting frame 14.

Figure 5:
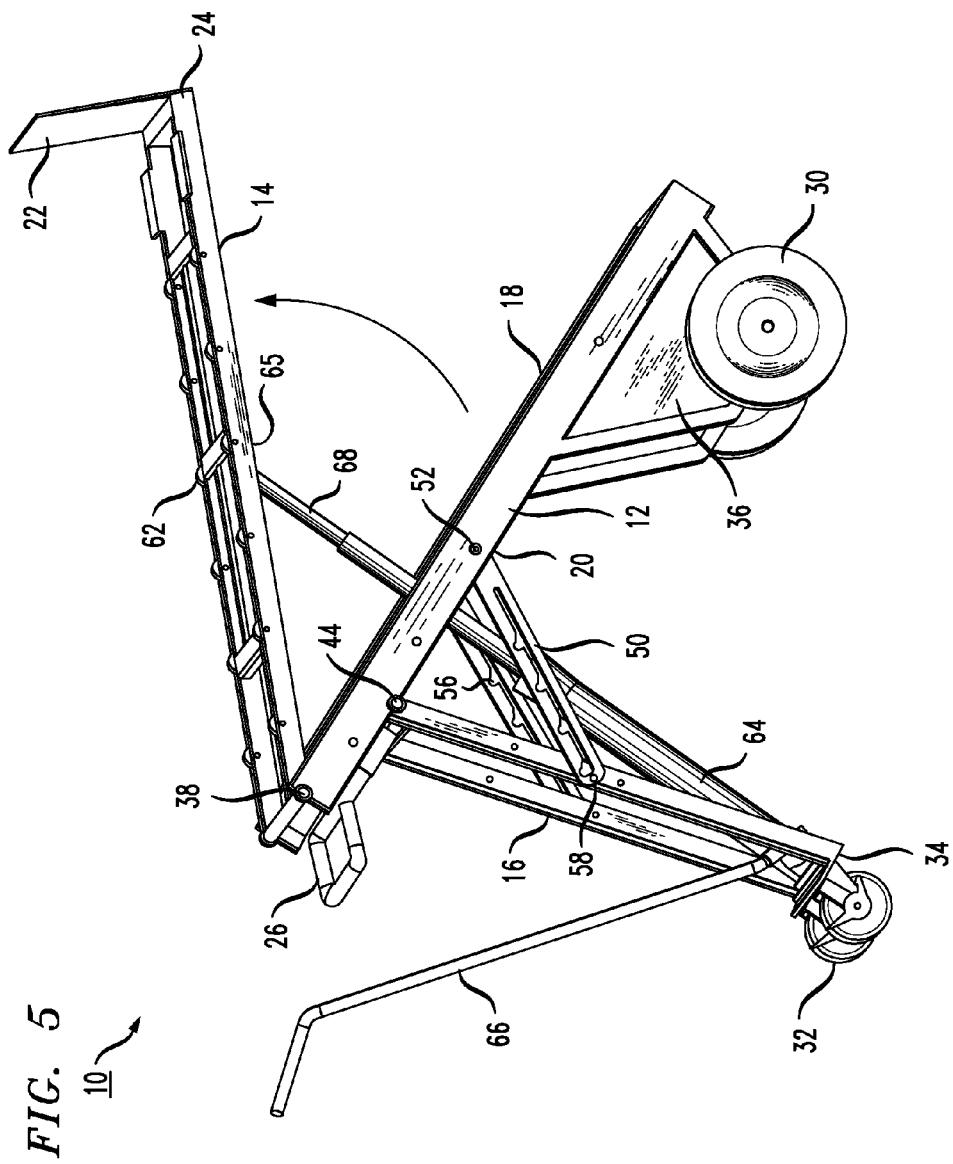
FIG. 5 illustrates an alternative configuration of the inventive hand truck, in this case including a removable jack that may be used to assist in raising and lowering the pivoting frame with respect to the main frame.

In situations where it is required to raise/lower a relatively heavy load (for example, a refrigerator) that is placed on pivoting frame 14, it is preferred to utilize pneumatic action to raise/lower pivoting frame 14. This alternative is shown in FIG. 5, which illustrates a removable pneumatic jack 64 disposed between lower termination 34 of rear frame 16 and a defined location 65 along pivoting frame 14. A removable jack handle 66 is shown in FIG. 5 as attached to jack 64, where handle 66 is used to control the movement of a piston 68 within jack 64 and thus provide rotational (lifting) movement of pivoting frame 14 with respect to main frame 12 (indicated by the arrow in FIG. 5). It is an aspect of the present invention that the engagement between piston 68 and pivoting frame 14 (at location 65) will securely hold raised pivoting frame 14 in its horizontal (platform) position as a heavy load is transferred between hand truck 10 and a raised position (loading dock, truck, etc.).

Figure 6:
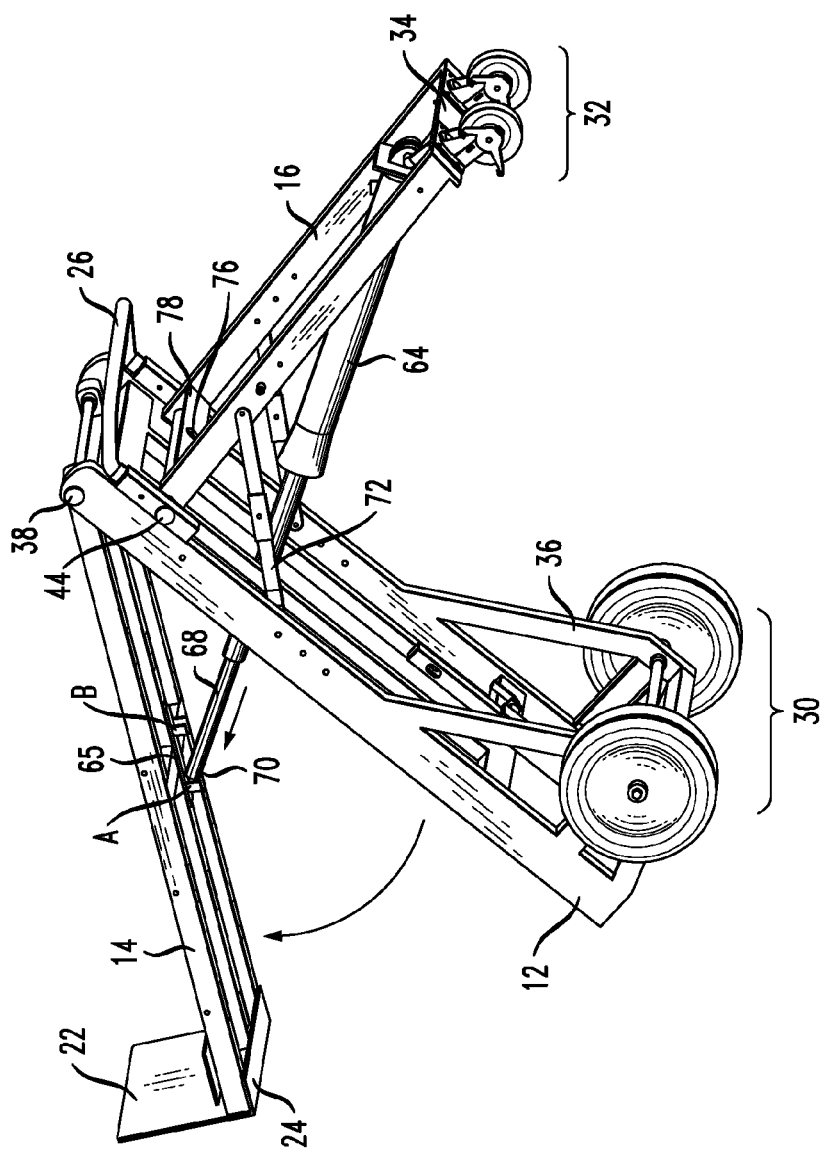
FIG. 6 is another view of the configuration of FIG. 6, particularly illustrating an exemplary mechanism for removably attaching the jack to the pivoting frame.

FIG. 6 is another isometric view of convertible hand truck 10, in this case particularly illustrating a securing plate 70, attached to the rear face of pivoting frame 14. Securing plate 70, as shown, is used to engage the end termination of piston 68 and thus hold jack 64 in place and ensure that pivoting frame 14 will remain in its raised position. In this particular configuration, securing plate 70 includes two separate "stops" (illustrated as A and B) that may be used to engage piston 68, thus providing some adjustability in the opening between main frame 12 and pivoting frame 14. Also shown in this particular embodiment is an alternative type of bracket for coupling main frame 12 to back frame 16. In particular, a conventional hinged locking bracket 72 is used to control the "opening" and "closing" of back frame 16 with respect to main frame 12. When using this type of conventional hinged locking bracket, the separation S between main frame 12 and back frame 16 is fixed and cannot be adjusted.

Figure 7:
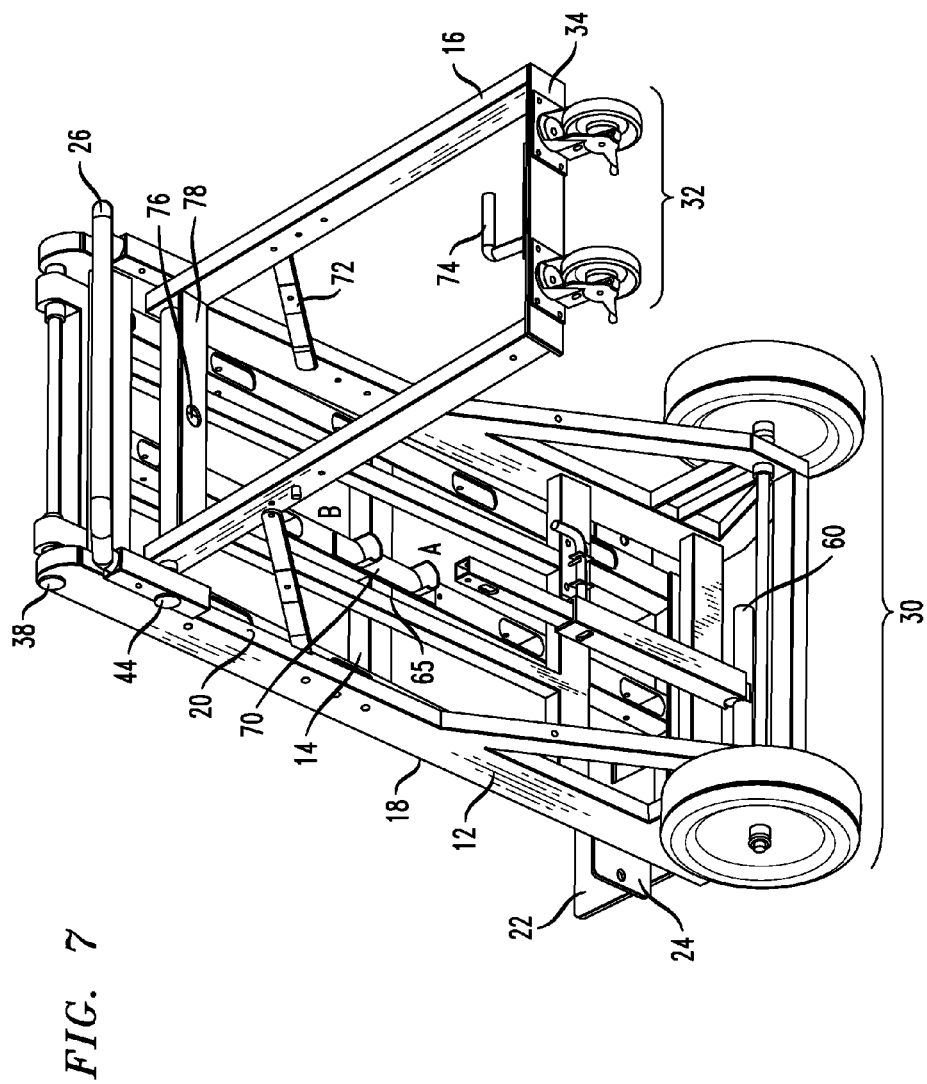
FIG. 7 is another view of the configuration of FIG. 6, in this case with pivoting frame in its closed position and the jack removed.
Figure 8:
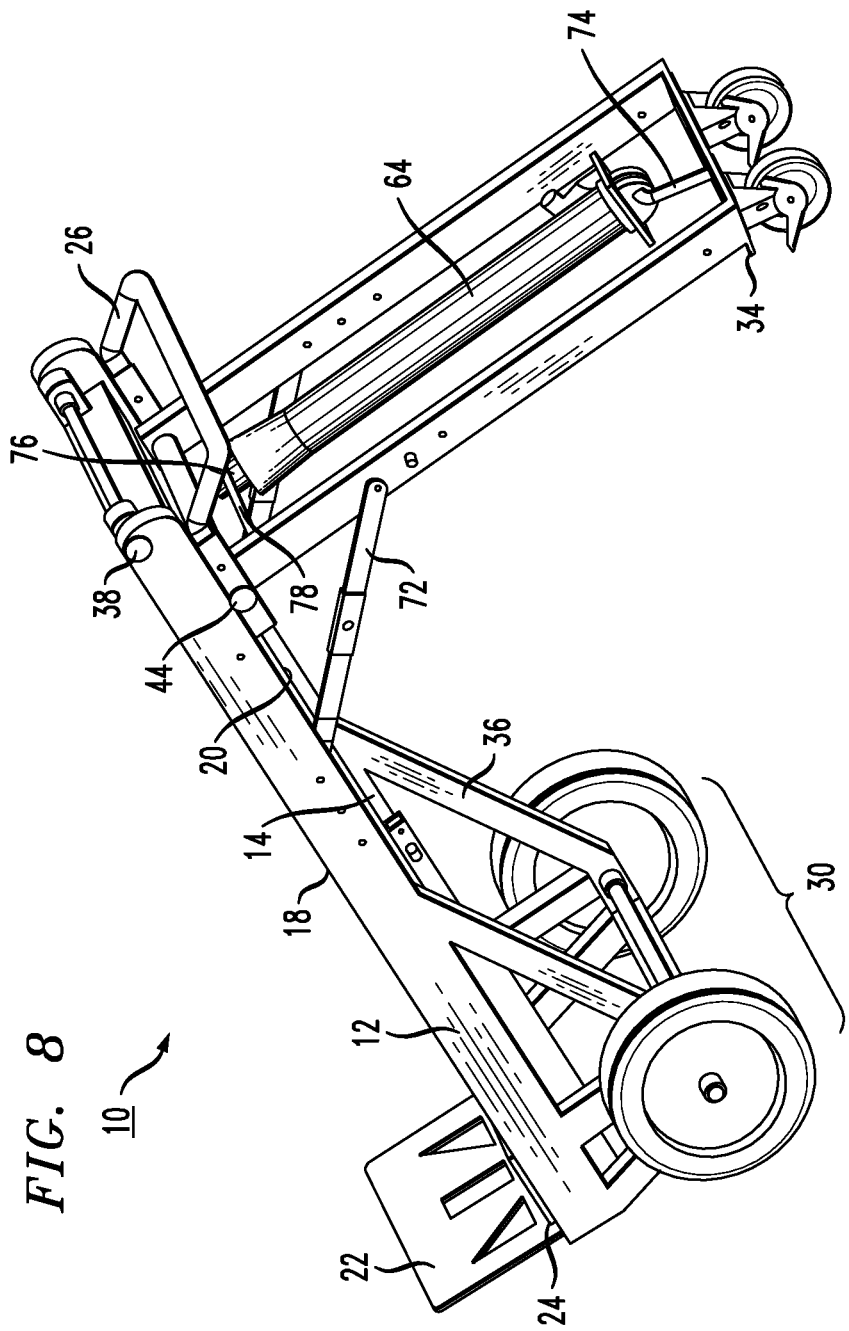
FIG. 8 is an enlarged view of the configuration of FIG. 7, illustrating the attachment of the removable jack to the back frame of the hand truck.

FIG. 7 is another view of the configuration of FIG. 6, in this case with pivoting frame in its closed position and jack 64 removed. In this view, the specific features of securing plate 70 (as well as stops A and B of plate 70) are clearly visible. Again, hinged locking bracket 72 is shown in this embodiment. Also shown is a locking pin 74, attached to back frame 16. Locking pin 74 may be used to removably attach the jack component to hand truck 10. Once loaded into this position, the opposing end of piston 68 will pass through aperture 76 formed in a cross-member 78 of back frame 16, further ensuring that jack 64 will remain in place until needed for use. FIG. 8 illustrates the use of locking pin 74 to hold removable jack 64 in place within back frame 16 (i.e., in a "stowed" position) when it is not needed. Although aperture 76 is not visible in this view, a portion of cross-member 78 is shown, and it is clear that piston 68 has been positioned to be enclosed by aperture 76.

Figure 9:
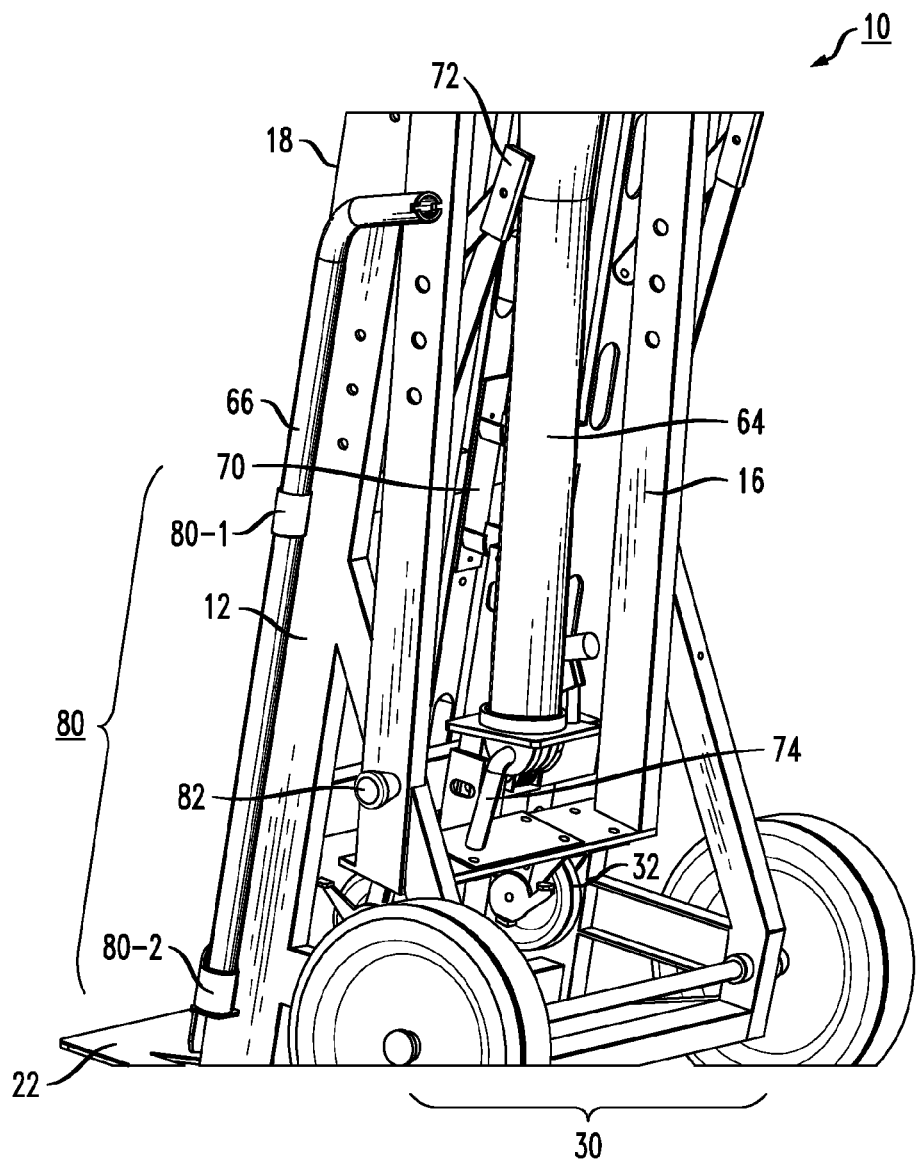
FIG. 9 is an enlarged isometric view of a portion of the configuration of FIG. 8, in this case clearly showing the position of a locking pin and its use to removably hold the jack in place within the back frame.

FIG. 9 is an enlarged isometric view of a portion of the configuration of FIG. 8, in this case clearly showing the position of locking pin 74 and its use to hold jack 64 in place. In this particular embodiment, a side attachment component 80 is included along main frame 12 and is used to hold jack handle 66 in a convenient position when not in use. In this particular embodiment, component 80 includes an upper open ring 80-1 through which jack handle 66 is inserted. A lower ring 80-2 is closed along its bottom surface to hold jack handle 66 in place. While this is one configuration for attaching jack handle 66 to hand truck 10, many other arrangements may be used and all are considered to fall within the scope of the present invention. Also shown in this view is a spring-loaded locking pin 82, which is attached to main frame 12 and may be used to engage/disengage back frame 16 with respect to main frame 12. The inclusion of locking pin 82 (which actually takes the form of two separate pins, one on each side of main frame 12) is considered a preferred way to prevent unwanted movement of back frame 16 with respect to main frame 12 (e.g., back frame unexpectedly opening when using hand truck 10 as a two-wheeled truck).

Figure 10:
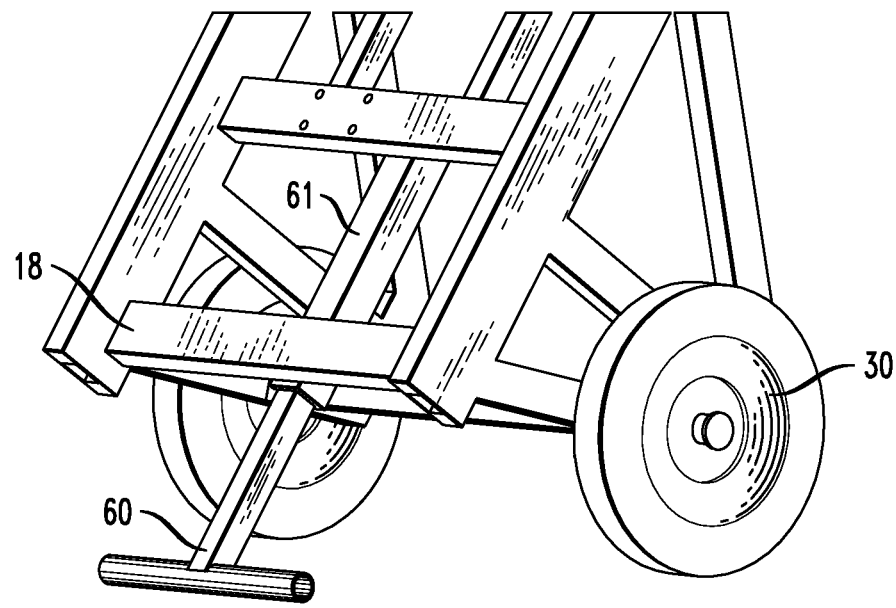
FIG. 10 is an enlarged view of a portion of the main frame, including a anchor leg ("kick stop") used to provide additional stability to the hand truck.
Figure 11:
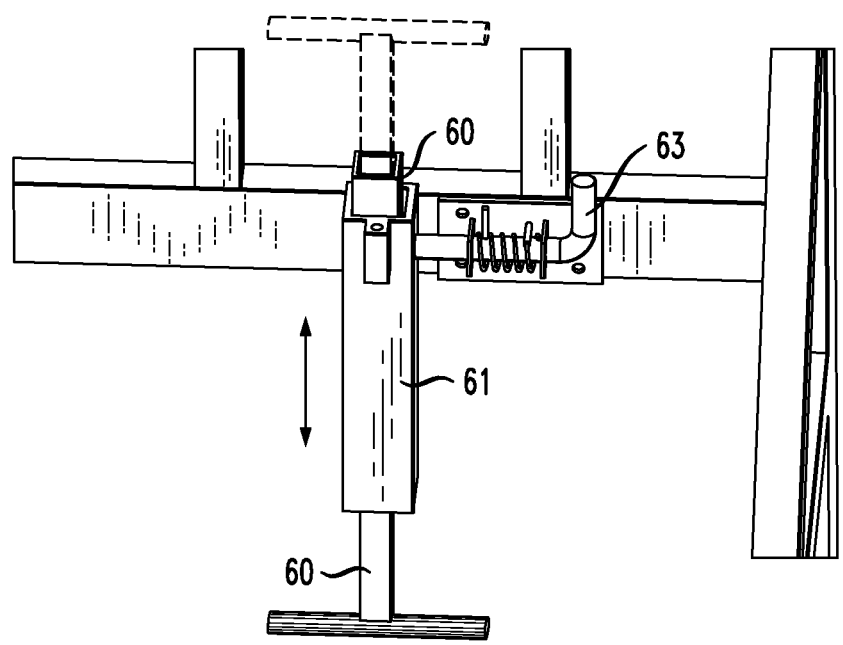
FIG. 11 is a rear view of the portion of the main frame illustrated in FIG. 10.

As mentioned above with respect to FIG. 3, main frame 12 may be formed to include a kick stop 60. FIG. 10 is a close-up view of a portion of main frame 12 and an included kick stop 60. Preferably, kick stop 60 may be raised or lowered, as needed. In the embodiment shown in FIG. 10, kick stop 60 is fully extended to contact the ground (in combination with primary wheels 30). Main frame 12 is configured in this case to include a housing member 61 within which kick stop 60 may be enclosed when not in use. FIG. 11 illustrates housing member 61 from the opposite side, and also illustrates a spring-loaded control pin 63 that may be used to control the "up and down" movement of kick stop 60 within housing member 61.

While various embodiments and features of the inventive hand truck have been described above and shown in the associated drawings, it is to be understood that there exist various modifications which may be made to one or more of the specific components forming the hand truck, and remain within the scope of the present invention. Indeed, the scope of the present invention is intended to be limited only by the language of the claims appended hereto.

What is claimed is:

1. A hand truck for transporting loads, comprising:
   a main frame, including a pair of primary wheels attached to a lower end termination and a handle attached to an upper end termination;
   a back frame, rotatably attached to a rear portion of the main frame along a first hinge member, the back frame including a pair of secondary wheels attached to a lower end termination, the back frame for moving between a closed position when in contact with the main frame and an open position as controlled by the first hinge member; and
   a pivoting frame, rotatably attached to a front portion of the main frame along a second hinge member at the upper end termination of the main frame, the pivoting frame for moving between a closed position when in contact with the main frame and an open, horizontal position as controlled by the second hinge member; and
   a removable jack for controlling the movement of the pivoting frame with respect to the main frame, the removable jack attached to the back frame, with an opposing piston termination of the removable jack engaged with a defined coupling location on the pivoting frame and including, a jack handle for controlling the movement of the piston.

2. The hand truck as defined in claim 1 wherein the pivoting frame includes a toe plate disposed along a lower termination thereof.

3. The hand truck as defined in claim 1 wherein the jack handle is removable from the jack.

4. The hand truck as defined in claim 3 wherein the main frame includes a side attachment component for housing the jack handle when not in use.

5. The hand truck as defined in claim 1 wherein the back frame includes a locking pin configuration for maintaining the removable jack in a stowed position when not in use.

6. The hand truck as defined in claim 5 wherein the back frame includes an upper cross-member with an aperture formed through a central region of the upper cross member, such that an opposing end of the removable jack will pass through and be retained within the aperture when the removable jack is in the stowed position.

7. The hand truck as defined in claim 1 wherein the pivoting frame further comprises a plurality of rollers to facilitate the movement of a load between the hand truck and a designated location when the pivoting frame is in the open, horizontal position.

8. The hand truck as defined in claim 1 wherein the hand truck further comprises a bracket support coupled between the main frame and the back frame.

9. The hand truck as defined in claim 8 wherein the bracket support is adjustable to control the separation between the primary wheels and the secondary wheels when the back frame is in the open position.

10. The hand truck as defined in claim 8 wherein the adjustable bracket support comprises a pair of slotted braces attached to the main frame and a plurality of pins disposed along each side leg of the back frame, wherein the slots engage with a selected pair of pins to determine the separation between the primary wheels and the secondary wheels.

11. The hand truck as defined in claim 1 wherein the hand truck further comprises at least one locking pin for removably engaging a lower termination of the back frame with respect to the main frame.

\* \* \* \* \*